US010355308B2

(12) United States Patent
Kanno et al.

(10) Patent No.: US 10,355,308 B2
(45) Date of Patent: Jul. 16, 2019

(54) SULFIDE SOLID ELECTROLYTE MATERIAL, BATTERY, AND PRODUCING METHOD FOR SULFIDE SOLID ELECTROLYTE MATERIAL

(71) Applicant: TOYOTA JIDOSHA KABUSHIKI KAISHA, Toyota-shi, Aichi-ken (JP)

(72) Inventors: Ryoji Kanno, Kawasaki (JP); Masaaki Hirayama, Yokohama (JP); Yuki Kato, Susono (JP); Takamasa Ohtomo, Susono (JP); Hisatsugu Yamasaki, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 467 days.

(21) Appl. No.: 14/896,281

(22) PCT Filed: May 29, 2014

(86) PCT No.: PCT/JP2014/064269
§ 371 (c)(1),
(2) Date: Dec. 4, 2015

(87) PCT Pub. No.: WO2014/196442
PCT Pub. Date: Dec. 11, 2014

(65) Prior Publication Data
US 2016/0149258 A1 May 26, 2016

(30) Foreign Application Priority Data
Jun. 7, 2013 (JP) .................................. 2013-121317

(51) Int. Cl.
*H01B 1/10* (2006.01)
*H01M 10/052* (2010.01)
(Continued)

(52) U.S. Cl.
CPC ..... *H01M 10/0562* (2013.01); *H01M 10/052* (2013.01); *H01M 10/058* (2013.01);
(Continued)

(58) Field of Classification Search
None
See application file for complete search history.

(56) References Cited

U.S. PATENT DOCUMENTS

2009/0159839 A1*  6/2009  Seino .................... H01B 1/122
                                                  252/182.1
2013/0040208 A1    2/2013  Kanno et al.
(Continued)

FOREIGN PATENT DOCUMENTS

EP        1 732 152 A1   12/2006
JP       2013-037897 A    2/2013
(Continued)

OTHER PUBLICATIONS

Machine translation of JP 2013-116837 A (Year: 2013).*
(Continued)

*Primary Examiner* — Robert S Carrico
(74) *Attorney, Agent, or Firm* — Oliff PLC

(57) ABSTRACT

The present invention aims to provide a sulfide solid electrolyte material with favorable ion conductivity, in which charge and discharge efficiency may be inhibited from decreasing. The object is attained by providing a sulfide solid electrolyte material, including: a Li element; a P element; and a S element, characterized in that the material has a peak at a position of $2\theta=30.21°\pm0.50°$ in X-ray diffraction measurement using a CuKα ray, and the sulfide solid electrolyte material does not substantially include a metallic element belonging to the third group to the sixteenth group.

18 Claims, 6 Drawing Sheets

OCTAHEDRON O
(LiS₆ OCTAHEDRON)

TETRAHEDRON T₁
(PS₄ TETRAHEDRON)

TETRAHEDRON T₂
(PS₄ TETRAHEDRON)

(51) Int. Cl.
*H01M 10/058* (2010.01)
*H01M 10/0525* (2010.01)
*H01M 10/0562* (2010.01)

(52) U.S. Cl.
CPC .......... *H01M 10/0525* (2013.01); *H01B 1/10* (2013.01); *H01M 2220/30* (2013.01); *H01M 2300/0068* (2013.01); *Y02T 10/7011* (2013.01)

(56) References Cited

U.S. PATENT DOCUMENTS

| | | |
|---|---|---|
| 2014/0363745 A1 | 12/2014 | Hirayama et al. |
| 2015/0017548 A1 | 1/2015 | Kato et al. |
| 2015/0037687 A1 | 2/2015 | Kanno et al. |
| 2015/0132638 A1 | 5/2015 | Adachi et al. |

FOREIGN PATENT DOCUMENTS

| | | |
|---|---|---|
| JP | 2013030440 A | 2/2013 |
| JP | 2013116837 A * | 6/2013 |
| JP | 2013149599 A | 8/2013 |
| JP | 2013177288 A | 9/2013 |
| WO | 2011/118801 A1 | 9/2011 |
| WO | 2013080540 A1 | 6/2013 |

OTHER PUBLICATIONS

Murayama, Masahiro et al; Material design of new lithium ionic conductor, thio-LISICON, in the Li2S-P2S5 system; Solid State Ionics 170 (2004) 173-180.

Kanno et al, "Lithium Ionic Conductor Thio-LISICON," Journal of the Electrochemical Society, vol. 148 (7), 2001, pp. A742-A746.

Kamaya et al., "A Lithium Superionic Conductor," Nature Materials, vol. 10, Sep. 2011, pp. 682-686.

Ong et al., "Phase stability, electrochemical stability and ionic conductivity in the Li10±1 MP2X12 (M=Ge, Si, Sn, Al or P, and X=O, S or Se) family of superionic conductors," Energy & Enviornmental Science, Oct. 2, 2012, pp. 1-23.

Takada et al., "Lithium ion conductive oxysulfide, Li3PO4—Li3PS4," Solid State Ionics, 176, 2005, pp. 2355-2359.

* cited by examiner

SULFIDE SOLID ELECTROLYTE MATERIAL, BATTERY, AND PRODUCING METHOD FOR SULFIDE SOLID ELECTROLYTE MATERIAL

TECHNICAL FIELD

The present invention relates to a sulfide solid electrolyte material with favorable ion conductivity, in which charge and discharge efficiency may be inhibited from decreasing.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

A sulfide solid electrolyte material is known as a solid electrolyte material used for an all solid lithium battery. For example, in Non Patent Literature 1, a Li ion conductor (a sulfide solid electrolyte material) having a composition of $Li_{(4-x)}Ge_{(1-x)}P_xS_4$ is disclosed. Also, in Patent Literature 1, an LiGePS-based sulfide solid electrolyte material with a high ratio of crystal phase having a specific peak in X-ray diffraction measurement is disclosed. In addition, in Non Patent Literature 2, an LiGePS-based sulfide solid electrolyte material is disclosed.

CITATION LIST

Patent Literature

Patent Literature 1: WO 2011/118801

Non Patent Literature

Non Patent Literature 1: Ryoji Kanno et al., "Lithium Ionic Conductor Thio-LISICON The $Li_2S$—$GeS_2$—$P_2S_5$ System", Journal of The Electrochemical Society, 148 (7) A742-A746 (2001)

Non Patent Literature 2: Noriaki Kamaya et al., "A lithium superionic conductor", Nature Materials, Advanced online publication, 31 Jul. 2011, DOI:10.1038/NMAT3066

SUMMARY OF INVENTION

Technical Problem

A solid electrolyte material with favorable ion conductivity is demanded from the viewpoint of achieving higher output of a battery. In Patent Literature 1, it is disclosed that a sulfide solid electrolyte material with a high ratio of a crystal phase having a specific peak in X-ray diffraction measurement has favorable ion conductivity. On the other hand, an LiGePS-based sulfide solid electrolyte material described in Patent Literature 1 is low in reduction resistance (in particular, reduction resistance during charge). Thus, for example, the problem is that charge and discharge efficiency is low in the case of producing a battery by using such a sulfide solid electrolyte material.

The present invention has been made in view of the problem, and the main object thereof is to provide a sulfide solid electrolyte material with favorable ion conductivity, in which charge and discharge efficiency may be inhibited from decreasing.

Solution to Problem

In order to solve the problems, the present invention provides a sulfide solid electrolyte material comprising: a Li element, a P element and a S element, the sulfide solid electrolyte material has a peak at a position of $2\theta=30.21°\pm0.50°$ in X-ray diffraction measurement using a $CuK\alpha$ ray, and the sulfide solid electrolyte material does not substantially comprise a metallic element belonging to a third group to a sixteenth group.

The present invention is provided with a crystal phase having a peak in the vicinity of $2\theta=30.21°$, so as to allow the sulfide solid electrolyte material with favorable ion conductivity. In addition, the sulfide solid electrolyte material does not substantially contain a metallic element belonging to the third group to the sixteenth group, so as to allow the sulfide solid electrolyte material with high reduction resistance, in which charge and discharge efficiency may be inhibited from decreasing.

In the invention, the sulfide solid electrolyte material preferably comprises a composition of $Li_{5x+2y+3}P_{1-x}S_4$ ($0 \leq x \leq 0.2$, $0 < y \leq 0.3$).

In the invention, the sulfide solid electrolyte material preferably comprises a composition of $Li_{5x+3}P_{1-x}S_4$ ($0.1 \leq x \leq 0.2$).

In the invention, the sulfide solid electrolyte material preferably has a peak at a position of $2\theta=24.60°\pm0.50°$ further.

Also, the present invention provides a sulfide solid electrolyte material comprising: an octahedron O composed of a Li element and a S element, a tetrahedron $T_1$ composed of a P element and a S element, and a tetrahedron $T_2$ composed of a P element and a S element, characterized in that the tetrahedron $T_1$ and the octahedron O share an edge, and the tetrahedron $T_2$ and the octahedron O contain a crystal structure sharing a corner.

According to the present invention, the octahedron O, the tetrahedron $T_1$ and the tetrahedron $T_2$ have a predetermined crystal structure (a three-dimensional structure), so as to allow the sulfide solid electrolyte material with favorable ion conductivity. In addition, the crystal structure is composed of Li, P and S, and does not contain a metallic element belonging to the third group to the sixteenth group, so as to allow the sulfide solid electrolyte material with high reduction resistance, in which charge and discharge efficiency may be inhibited from decreasing.

In the invention, the sulfide solid electrolyte material preferably comprises a composition of $Li_{5x+2y+3}P_{1-x}S_4$ ($0 \leq x \leq 0.2$, $0 < y \leq 0.3$).

In the invention, the sulfide solid electrolyte material preferably comprises a composition of $Li_{5x+3}P_{1-x}S_4$ ($0.1 \leq x \leq 0.2$).

Also, the present invention provides a battery comprising a cathode active material layer containing a cathode active material, an anode active material layer containing an anode active material, and an electrolyte layer formed between the cathode active material layer and the anode active material layer, characterized in that at least one of the cathode active material layer, the anode active material layer and the electrolyte layer contains the sulfide solid electrolyte material described above.

According to the present invention, the use of the sulfide solid electrolyte material described above allows the battery with high output and high reduction resistance.

Also, the present invention provides a producing method for a sulfide solid electrolyte material, the sulfide solid electrolyte material being the sulfide solid electrolyte material described above, comprising steps of: an ion conductive material synthesizing step of synthesizing an amorphized ion conductive material by melt extraction while using a raw material composition containing a constituent of the sulfide solid electrolyte material, and a heating step of obtaining the sulfide solid electrolyte material by heating the amorphized ion conductive material.

According to the present invention, amorphization is performed by melt extraction to thereafter perform the heating step, so as to allow the sulfide solid electrolyte material provided with a crystal phase having a peak in the vicinity of $2\theta=30.21°$. Thus, the sulfide solid electrolyte material with favorable ion conductivity may be obtained. In addition, the sulfide solid electrolyte material is provided with a crystal phase having a peak in the vicinity of $2\theta=30.21°$, so as to allow the sulfide solid electrolyte material with high reduction resistance, in which charge and discharge efficiency may be inhibited from decreasing.

Advantageous Effects of Invention

The present invention produces the effect such as to allow a sulfide solid electrolyte material with favorable ion conductivity, in which charge and discharge efficiency may be inhibited from decreasing.

DESCRIPTION OF EMBODIMENTS

Figure 1:
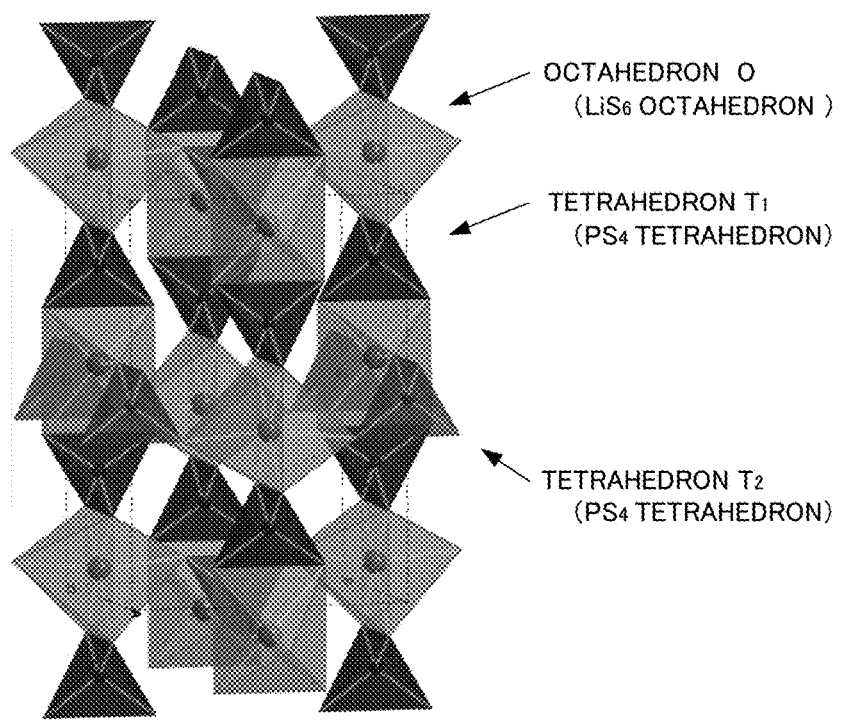
FIG. 1 is a perspective view explaining an example of a crystal structure of a sulfide solid electrolyte material of the present invention.

A sulfide solid electrolyte material, a battery and a producing method for a sulfide solid electrolyte material of the present invention are hereinafter described in detail.

A. Sulfide Solid Electrolyte Material

First, a sulfide solid electrolyte material of the present invention is described. The sulfide solid electrolyte material of the present invention may be roughly divided into two embodiments. Then, the sulfide solid electrolyte material of the present invention is described while divided into a first embodiment and a second embodiment.

1. First Embodiment

A sulfide solid electrolyte material of a first embodiment comprises a Li element, a P element and a S element, the sulfide solid electrolyte has a peak at a position of $2\theta=30.21°\pm0.50°$ in X-ray diffraction measurement using a CuKα ray, and the sulfide solid electrolyte does not substantially comprise a metallic element belonging to the third group to the sixteenth group.

The first embodiment is provided with a crystal phase having a peak in the vicinity of $2\theta=30.21°$, so as to allow the sulfide solid electrolyte material with favorable ion conductivity. In addition, the sulfide solid electrolyte material does not substantially comprise a metallic element belonging to the third group to the sixteenth group, so as to allow the sulfide solid electrolyte material with high reduction resistance, in which charge and discharge efficiency may be inhibited from decreasing. An LiGePS-based sulfide solid electrolyte material described in Patent Literature 1 contains Ge, so as to be easily subjected to reductive decomposition when used together with an anode active material which is low in electric potential, such as a carbon active material. On the contrary, the first embodiment does not contain the metallic element which is easily reduced, so as to allow the sulfide solid electrolyte material with high reduction resistance and allow charge and discharge efficiency to be inhibited from decreasing.

Here, the LiGePS-based sulfide solid electrolyte material described in Patent Literature 1 is conceived to typically have a crystal structure of $Li_{10}GeP_2S_{12}$. A crystal phase having this crystal structure is regarded as a crystal phase A'. The crystal phase A' is a crystal phase with high ion conductivity. Also, the crystal phase A' ordinarily has peaks at a position of $2\theta=17.38°, 20.18°, 20.44°, 23.56°, 23.96°, 24.93°, 26.96°, 29.07°, 29.58°, 31.71°, 32.66°$ and $33.39°$. Incidentally, these peak positions occasionally shift in a range of $\pm0.50°$ for the reason that a crystal lattice changes somewhat due to factors such as material composition.

The sulfide solid electrolyte material of the first embodiment is conceived to have the same crystal phase A as the crystal phase A'. That is to say, the sulfide solid electrolyte material of the first embodiment is conceived to typically have a crystal structure such that Ge of $Li_{10}GeP_2S_{12}$ is substituted with P. Also, the crystal phase A ordinarily has peaks at a position of 2θ=17.69°, 20.60°, 21.01°, 23.94°, 24.60°, 26.32°, 27.62°, 29.96°, 30.21°, 32.15°, 32.54° and 34.33°. Incidentally, also these peak positions occasionally shift in a range of ±0.50°. Also, although the tendency of the peak positions of the crystal phase A and the crystal phase A' corresponds, difference is somewhat observed. The reason therefor is conceived to be that the ionic radius of the P element was so smaller than the ionic radius of a Ge element that lattice constant decreased.

Also, the LiGePS-based sulfide solid electrolyte material described in Patent Literature 1 has a peak in the vicinity of 2θ=27.33°. A crystal phase B' having this peak is a crystal phase with lower ion conductivity than the crystal phase A' described above. Also, the crystal phase B' is ordinarily conceived to have peaks of 2θ=17.46°, 18.12°, 19.99°, 22.73°, 25.72°, 27.33°, 29.16° and 29.78°. Incidentally, also these peak positions occasionally shift in a range of ±0.50°.

The sulfide solid electrolyte material of the first embodiment offers a possibility of having the same crystal phase B as the crystal phase B'. The crystal phase B is conceived to be in a range of ±1.0° to the peak position of the crystal phase B'. In the first embodiment, in the case where diffraction intensity at a peak in the vicinity of 2θ=30.21° is regarded as $I_A$ and diffraction intensity at a peak in the vicinity of 2θ=27.33° is regarded as $I_B$, a value of $I_B/I_A$ is, for example, less than 0.50, preferably 0.45 or less, more preferably 0.25 or less, far more preferably 0.15 or less, particularly preferably 0.07 or less. Also, a value of $I_B/I_A$ is preferably 0. In other words, it is preferable that the sulfide solid electrolyte material of the first embodiment does not have a peak in the vicinity of 2θ=27.33°. Also, it is preferable that the sulfide solid electrolyte material of the first embodiment does not have a peak of the crystal phase B.

The sulfide solid electrolyte material of the first embodiment is characterized by not substantially comprise a metallic element belonging to the third group to the sixteenth group. These metallic elements may be a cause of deteriorating reduction resistance of the sulfide solid electrolyte material. Thus, in the first embodiment, no substantial use of these metallic elements allows an improvement in reduction resistance to be intended. Here, the metallic element belonging to the third group to the sixteenth group signifies a metallic element belonging to the third group to the twelfth group and a metallic element belonging to the thirteenth group to the sixteenth group. Also, the metallic element belonging to the thirteenth group signifies aluminum and an element with a larger atomic number than aluminum, the metallic element belonging to the fourteenth group signifies silicon and an element with a larger atomic number than silicon, the metallic element belonging to the fifteenth group signifies arsenic and an element with a larger atomic number than arsenic, and the metallic element belonging to the sixteenth group signifies tellurium and an element with a larger atomic number than tellurium.

Also, in the first embodiment, "not substantially comprising a metallic element belonging to the third group to the sixteenth group" signifies that the molar ratio of the metallic element to the P element (the number of moles of the metallic element/the number of moles of the P element) is 0.1 or less. Above all, the molar ratio is preferably 0.08 or less, more preferably 0.05 or less. The reason therefor is to allow an improvement in reduction resistance to be further intended. The ratio of the metallic element may be confirmed by ICP emission spectroscopy. The mass distribution is measured by ICP emission spectroscopy and divided by atomic weight to obtain the number of moles (molar fraction) of each element. Incidentally, it may be confirmed by X-ray photoelectron spectroscopy that the sulfide solid electrolyte material has the Li element, the P element and the S element.

Also, the sulfide solid electrolyte material of the first embodiment contains the Li element, the P element and the S element. The sulfide solid electrolyte material of the first embodiment may contain only the Li element, the P element and the S element, or contain another element. Part of the Li element may be substituted with a monovalent or bivalent metallic element. It is conceived that the substitution of part of the Li element with another element improves ion conductivity. Examples of the monovalent or bivalent metallic element include at least one kind of Na, K, Mg and Ca. The substituted amount of the metallic element may be determined by Rietveld analysis of XRD and ICP emission spectroscopy, for example.

Also, part of the S element may be substituted with an O element. It is conceived that the substitution of part of the S element with the O element changes the shape of a tunnel for contributing to ion conduction in the crystal to improve ion conductivity. The ratio of the O element to the total of the S element and the O element (O/(S+O)) is, for example, preferably 0.1% or more, more preferably 0.5% or more. The substituted amount ratio of the O element is, for example, preferably 50% or less, more preferably 34% or less. The substituted amount of the O element may be determined by Rietveld analysis of XRD and Rietveld analysis of neutron diffraction, for example.

The composition of the sulfide solid electrolyte material of the first embodiment is not particularly limited. Above all, the sulfide solid electrolyte material of the first embodiment preferably comprises a composition of $Li_{5x+2y+3}P_{1-x}S_4$ (0≤x≤0.2, 0<y≤0.3). In particular, the inclusion of an ion conductor having the composition of $Li_{5x+2y+3}P_{1-x}S_4$ as the main component allows the sulfide solid electrolyte material with high reduction resistance. Also, the metallic element belonging to the third group to the sixteenth group may be contained if the metallic element is of a very small amount (an amount such as not to be substantially contained). Incidentally, more strictly, the composition may be also represented as $Li_{5x+2y+3}P^{(III)}_y P^{(V)}_{1-x-y}S_4$. $P^{(III)}$ and $P^{(V)}$ are trivalent and pentavalent phosphorus respectively. Also, the composition is a composition out of a tie line of $Li_2S$ and $P_2S_5$, and a composition obtained in the case of using $Li_2S$, $P_2S_5$ and P. Also, the composition is determined while assuming a pseudo ternary system of $Li_2S$, $Li_5PS_4$ (an ortho-composition using trivalent phosphorus) and $Li_3PS_4$ (an ortho-composition using pentavalent phosphorus). That is to say, $$x(Li_8S_4)\cdot yLi_5P^{(III)}S_4\cdot(1-x-y)Li_3P^{(V)}S_4 \rightarrow Li_{5x+2y+3}P^{(III)}_y P^{(V)}_{1-x-y}S_4$$

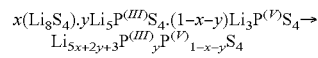

Also, the sulfide solid electrolyte material of the first embodiment preferably contains a composition of $Li_{5x+3}P_{1-x}S_4$ (0.1≤x≤0.2). In particular, the inclusion of an ion conductor having the composition of $Li_{5x+3}P_{1-x}S_4$ as the main component allows the sulfide solid electrolyte material with high reduction resistance. Also, the metallic element belonging to the third group to the sixteenth group may be contained if the metallic element is of a very small amount (an amount such as not to be substantially contained). Also, the composition is a composition on a tie line of $Li_2S$ and $P_2S_5$.

The sulfide solid electrolyte material of the first embodiment is ordinarily a crystalline sulfide solid electrolyte material. Also, the sulfide solid electrolyte material of the first embodiment is preferably high in ion conductivity, and ion conductivity of the sulfide solid electrolyte material at 25° C. is preferably $1.0 \times 10^{-4}$ S/cm or more. Also, the shape of the sulfide solid electrolyte material of the first embodiment is not particularly limited, but examples thereof include a powdery shape. In addition, the average particle diameter of the powdery sulfide solid electrolyte material is preferably within a range of 0.1 μm to 50 μm, for example.

The sulfide solid electrolyte material of the first embodiment has so favorable ion conductivity as to be capable of being used for optional uses in which ion conductivity is required. Above all, the sulfide solid electrolyte material of the first embodiment is preferably used for a battery. The reason therefor is to be capable of greatly contributing to achieving higher output of a battery. Also, a producing method for a sulfide solid electrolyte material of the first embodiment is described in detail in the after-mentioned "C. Producing method for sulfide solid electrolyte material". Also, the sulfide solid electrolyte material of the first embodiment may have characteristics of the after-mentioned second embodiment together.

2. Second Embodiment

Next, a second embodiment of a sulfide solid electrolyte material of the present invention is described.

FIG. 1 is a perspective view explaining an example of a crystal structure of the sulfide solid electrolyte material of the second embodiment. In the crystal structure shown in FIG. 1, the octahedron O is $LiS_6$ octahedron having Li as the central element and having six pieces of S at the corner of the octahedron. The tetrahedron $T_1$ is $PS_4$ tetrahedron having P as the central element and having four pieces of S at the corner of the tetrahedron. The tetrahedron $T_2$ is $PS_4$ tetrahedron having P as the central element and having four pieces of S at the corner of the tetrahedron. In the second embodiment, the tetrahedron $T_1$ and the octahedron O share an edge, and the tetrahedron $T_2$ and the octahedron O share a corner.

According to the second embodiment, the octahedron O, the tetrahedron $T_1$ and the tetrahedron $T_2$ have a predetermined crystal structure (a three-dimensional structure), so as to allow the sulfide solid electrolyte material with favorable ion conductivity. In addition, the crystal structure is composed of Li, P and S, and does not contain a metallic element belonging to the third group to the sixteenth group, so as to allow the sulfide solid electrolyte material with high reduction resistance, in which charge and discharge efficiency may be inhibited from decreasing.

The sulfide solid electrolyte material of the second embodiment is not particularly limited if the sulfide solid electrolyte material is such as to have the crystal structure. With regard to the crystal structure, part of the Li element, the P element and the S element may be substituted with another element. Also, the sulfide solid electrolyte material of the second embodiment preferably contains the crystal structure as the main body. "Containing the crystal structure as the main body" signifies that the ratio of the crystal structure is largest with respect to all crystal phases contained in the sulfide solid electrolyte material. The ratio of the crystal structure is, for example, 50 wt % or more, preferably 70 wt % or more, more preferably 90 wt % or more. Incidentally, the ratio of the crystal structure may be measured by radiated light XRD, for example. In particular, the sulfide solid electrolyte material of the second embodiment is preferably a single-phase material of the crystal structure. The reason therefor is to allow ion conductivity to be further heightened. Also, the sulfide solid electrolyte material of the second embodiment may have characteristics of the first embodiment described above together.

B. Battery

Next, a battery of the present invention is described.

Figure 2:
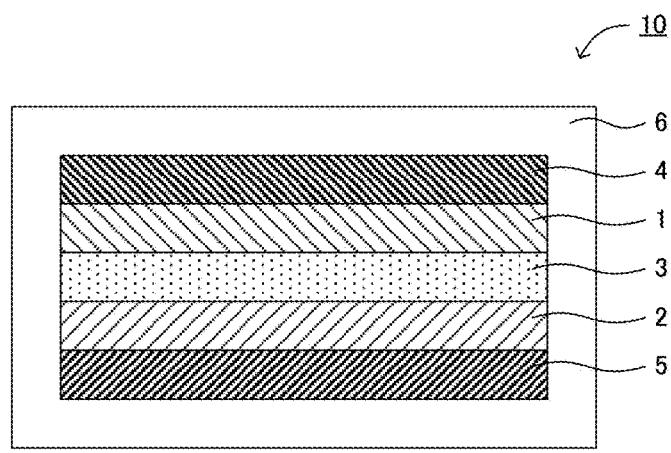
FIG. 2 is a schematic cross-sectional view showing an example of a battery of the present invention.

FIG. 2 is a schematic cross-sectional view showing an example of the battery of the present invention. A battery 10 in FIG. 2 comprises a cathode active material layer 1 containing a cathode active material, an anode active material layer 2 containing an anode active material, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. In the present invention, at least one of the cathode active material layer 1, the anode active material layer 2 and the electrolyte layer 3 is greatly characterized by containing the sulfide solid electrolyte material described in the "A. Sulfide solid electrolyte material".

According to the present invention, the use of the sulfide solid electrolyte material described above allows the battery with high output and high reduction resistance.

The battery of the present invention is hereinafter described in each constitution.

1. Anode Active Material Layer

The anode active material layer in the present invention is a layer containing at least an anode active material, and may contain at least one of a solid electrolyte material, a conductive material and a binder, as required. In particular, in the present invention, the anode active material layer contains a solid electrolyte material, which is preferably the above-mentioned sulfide solid electrolyte material. The reason therefor is because the above-mentioned sulfide solid electrolyte material has high reduction resistance. The ratio of the above-mentioned sulfide solid electrolyte material contained in the anode active material layer varies with kinds of a battery and is preferably, for example, within a range of 0.1% by volume to 80% by volume, above all, within a range of 1% by volume to 60% by volume, and particularly, within a range of 10% by volume to 50% by volume. Also, examples of an anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon.

The anode active material layer may further contain a conductive material. The addition of the conductive material allows conductivity of the anode active material layer to be improved. Examples of the conductive material include acetylene black, Ketjen Black and carbon fiber. Also, the anode active material layer may contain a binder. Examples of kinds of the binder include a fluorine-containing binder such as polyvinylidene fluoride (PVDF). Also, the thickness of the anode active material layer is preferably within a range of 0.1 μm to 1000 μm, for example.

2. Electrolyte Layer

The electrolyte layer in the present invention is a layer formed between the cathode active material layer and the anode active material layer. The electrolyte layer is not particularly limited if the layer is a layer such as to allow ion conduction, but is preferably a solid electrolyte layer composed of a solid electrolyte material. The reason therefor is to allow the battery with high safety as compared with a battery using a liquid electrolyte. In addition, in the present invention, a solid electrolyte layer preferably contains the above-mentioned sulfide solid electrolyte material. The ratio of the above-mentioned sulfide solid electrolyte material contained in a solid electrolyte layer is preferably, for example, within a range of 10% by volume to 100% by volume, above all, within a range of 50% by volume to 100% by volume. The thickness of a solid electrolyte layer is preferably within a range of 0.1 μm to 1000 μm, for example, and within a range of 0.1 μm to 300 μm, above all. Also, examples of a method for forming a solid electrolyte layer include a method for compression-molding a solid electrolyte material.

Also, the electrolyte layer in the present invention may be a layer composed of a liquid electrolyte. The case of using a liquid electrolyte allows the higher-output battery though safety needs to be further considered as compared with the case of using a solid electrolyte layer. Also, in this case, ordinarily, at least one of the cathode active material layer and the anode active material layer contains the above-mentioned sulfide solid electrolyte material. A liquid electrolyte ordinarily contains a lithium salt and an organic solvent (a nonaqueous solvent). Examples of the lithium salt include inorganic lithium salts such as $LiPF_6$, $LiBF_4$, $LiClO_4$ and $LiAsF_6$, and organic lithium salts such as $LiCF_3SO_3$, $LiN(CF_3SO_2)_2$, $LiN(C_2F_5SO_2)_2$ and $LiC(CF_3SO_2)_3$. Examples of the above-mentioned organic solvent include ethylene carbonate (EC), propylene carbonate (PC), dimethyl carbonate (DMC), diethyl carbonate (DEC), ethylmethyl carbonate (EMC) and butylene carbonate (BC).

3. Cathode Active Material Layer

The cathode active material layer in the present invention is a layer containing at least a cathode active material, and may contain at least one of a solid electrolyte material, a conductive material and a binder, as required. In particular, in the present invention, the cathode active material layer contains a solid electrolyte material, which is preferably the above-mentioned sulfide solid electrolyte material. The ratio of the above-mentioned sulfide solid electrolyte material contained in the cathode active material layer varies with kinds of a battery and is preferably, for example, within a range of 0.1% by volume to 80% by volume, above all, within a range of 1% by volume to 60% by volume, and particularly, within a range of 10% by volume to 50% by volume. Also, examples of a cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$. Incidentally, a conductive material and a binder used for the cathode active material layer are the same as the case of the above-mentioned anode active material layer. Also, the thickness of the cathode active material layer is preferably within a range of 0.1 μm to 1000 μm, for example.

4. Other Constitutions

The battery of the present invention comprises at least the above-mentioned anode active material layer, electrolyte layer and cathode active material layer ordinarily further comprising a cathode current collector for collecting the cathode active material layer and an anode current collector for collecting the anode active material layer. Examples of a material for the cathode current collector include SUS, aluminum, nickel, iron, titanium and carbon. On the other hand, examples of a material for the anode current collector include SUS, copper, nickel and carbon. Also, the thickness and shape of the cathode current collector and the anode current collector are preferably selected properly in accordance with factors such as uses of a battery. Also, a battery case of a general battery may be used for a battery case used for the present invention. Examples of the battery case include a battery case made of SUS.

5. Battery

The battery of the present invention may be a primary battery or a secondary battery, and preferably a secondary battery among them. The reason therefor is to be repeatedly charged and discharged and be useful as a car-mounted battery, for example. Examples of the shape of the battery of the present invention include a coin shape, a laminate shape, a cylindrical shape and a rectangular shape. Also, a producing method for the battery of the present invention is not particularly limited if the method is a method such as to allow the above-mentioned battery, but the same method as a producing method for a general battery may be used. For example, in the case where the battery of the present invention is an all solid state battery, examples of a producing method therefor include a method such that a material composing a cathode active material layer, a material composing a solid electrolyte layer and a material composing an anode active material layer are sequentially pressed to thereby produce a power generating element and this power generating element is stored inside a battery case, which is crimped.

C. Producing Method for Sulfide Solid Electrolyte Material

Next, a producing method for a sulfide solid electrolyte material of the present invention is described.

Figure 3:
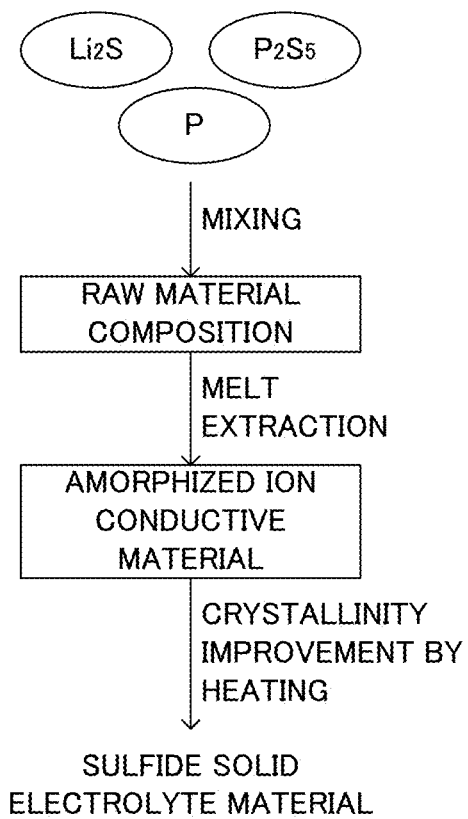
FIG. 3 is an explanatory view showing an example of a producing method for a sulfide solid electrolyte material of the present invention.

FIG. 3 is an explanatory view showing an example of the producing method for the sulfide solid electrolyte material of the present invention. In the producing method for the sulfide solid electrolyte material in FIG. 3, first, a raw material composition is produced by mixing $Li_2S$, $P_2S_5$ and P. On this occasion, in order to prevent the raw material composition from deteriorating due to moisture in the air, the raw material composition is preferably produced under an inert gas atmosphere. Next, an amorphized ion conductive material is obtained by melt extraction while using the raw material composition. Next, the amorphized ion conductive material is heated for improving crystallinity to thereby obtain a sulfide solid electrolyte material.

According to the present invention, amorphization is performed by melt extraction to thereafter perform the heating step, so as to allow the sulfide solid electrolyte material provided with a crystal phase having a peak in the vicinity of $2\theta=30.21°$. Thus, the sulfide solid electrolyte material with favorable ion conductivity may be obtained. In addition, the sulfide solid electrolyte material does not substantially contain a metallic element belonging to the third group to the sixteenth group, so as to allow the sulfide solid electrolyte material with high reduction resistance, in which charge and discharge efficiency may be inhibited from decreasing.

Also, in particular, in the case where the raw material composition contains phosphorus as a simple substance, a slurry compound is occasionally obtained when amorphization is attempted by mechanical milling. On the contrary, in the present invention, the use of melt extraction for quenching a melt brings an advantage that an intended ion conductive material, not the slurry compound, is obtained.

The producing method for the sulfide solid electrolyte material of the present invention is hereinafter described in each step.

1. Ion Conductive Material Synthesizing Step

First, an ion conductive material synthesizing step in the present invention is described. The ion conductive material synthesizing step in the present invention is a step of synthesizing an amorphized ion conductive material by melt extraction while using a raw material composition containing a constituent of the sulfide solid electrolyte material.

The raw material composition in the present invention contains at least the Li element, the P element and the S element, and may contain another element such as the O element. Examples of a compound containing the Li element include a sulfide of Li and an oxide of Li. Specific examples of the sulfide of Li include $Li_2S$. Specific examples of the oxide of Li include $Li_2O$. Also, examples of a compound containing the P element include a simple substance of P, an oxide of P and a sulfide of P. Specific examples of the sulfide of P include $P_2S_5$. Specific examples of the oxide of P include $P_2O_5$. A compound containing S element is not particularly limited but may be a simple substance or a sulfide. Examples of the sulfide include a sulfide containing the above-mentioned element.

In the present invention, an amorphized ion conductive material is obtained by melt extraction. The melt extraction is a method such that the raw material composition is subject to a molten state by heating and thereafter amorphized by quenching. The heating temperature of the raw material composition is not particularly limited if the heating temperature is a temperature capable of subjecting the raw material composition to a molten state, but is, for example, 550° C. or more, preferably within a range of 700° C. to 1200° C. Examples of a heating method for the raw material composition include a method using a burning furnace. On the other hand, the cooling rate during quenching is, for example, 500° C./minute or more, preferably 700° C./minute or more. Also, the raw material composition is cooled by quenching up to preferably, for example, 100° C. or less, above all, 50° C. or less. The cooling method for a melt to be used is ordinarily a method for contacting the melt with a refrigerant directly or indirectly. Specific examples thereof include a method for contacting a vessel storing a melt with a liquid such as water, and a method for contacting a melt with a revolving metal roller.

Also, heat treatment (calcination) may be performed for the raw material composition before performing melt extraction. The reason therefor is that the use of a solid previously heat-treated allows a melt with high dispersibility in melting treatment thereafter. The temperature for heat treatment is, for example, within a range of 200° C. to 800° C., preferably within a range of 500° C. to 700° C. Also, the heating time is, for example, within a range of 30 minutes to 20 hours, preferably within a range of 2 hours to 10 hours: The heat treatment is preferably performed under an inert gas atmosphere or in a vacuum from the viewpoint of preventing oxidation.

2. Heating Step

A heating step in the present invention is a step of obtaining the above-mentioned sulfide solid electrolyte material by heating the above-mentioned amorphized ion conductive material.

The heating temperature in the present invention is not particularly limited if the heating temperature is a temperature such as to allow a desired sulfide solid electrolyte material, but is preferably a temperature of crystallization temperature or more of the crystal phase A (the crystal phase having a peak in the vicinity of $2\theta=30.21°$). Specifically, the above-mentioned heating temperature is preferably 300° C. or more, more preferably 350° C. or more, far more preferably 400° C. or more, and particularly preferably 450° C. or more. On the other hand, the above-mentioned heating temperature is preferably 1000° C. or less, more preferably 700° C. or less, far more preferably 650° C. or less, and particularly preferably 600° C. or less. Also, the heating time is preferably adjusted properly so as to allow a desired sulfide solid electrolyte material. For example, the heating time is preferably within the range of 30 minutes to 10 hours. Also, heating in the present invention is preferably performed under an inert gas atmosphere or in a vacuum from the viewpoint of preventing oxidation. Also, the sulfide solid electrolyte material obtained by the present invention is the same as the contents described in the above-mentioned 'A. Sulfide solid electrolyte material'; therefore, the description here is omitted.

Incidentally, the present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

Lithium sulfide ($Li_2S$, manufactured by Nippon Chemical Industrial Co., Ltd.), diphosphorus pentasulfide ($P_2S_5$, manufactured by Sigma-Aldrich Co. LLC.) and red phosphorus (P, manufactured by Kojundo Chemical Lab. Co., Ltd.) were used as a starting material. These powders were mixed in a glove box under an argon atmosphere at a ratio of 0.470526 g of $Li_2S$, 0.515941 g of $P_2S_5$ and 0.013533 g of P to obtain a raw material composition. Thereafter, the obtained raw material composition was put in a carbon-coated quartz tube and vacuum-sealed. The pressure of the quartz tube for vacuum-sealing was approximately 30 Pa. Next, the quartz tube was placed in a burning furnace, heated from room temperature to 550° C. over 6 hours, maintained at 550° C. for 8 hours, and thereafter slowly cooled up to room temperature. Thus, a sample A was obtained.

Next, powder of the obtained sample A was ground by using vibrating mill. TI-100™ manufactured by Cosmic Mechanical Technology Co., Ltd. was used for vibrating mill. Specifically, 2 g of the sample A obtained by the method and a vibrator made of alumina ($\phi$ 36.3 mm, height 48.9 mm) were put in a 10-mL pot made of zirconia and treated at the number of revolutions of 1440 rpm for 30 minutes. Thereafter, the obtained powder was put in a carbon-coated quartz tube and vacuum-sealed. The pressure of the quartz tube for vacuum-sealing was approximately 30 Pa. Next, the quartz tube was placed in a burning furnace, heated from room temperature to 950° C. over 2 hours, maintained at 950° C. for 1 hour, and thereafter projected into iced water and quenched. Thus, a sample B (an amorphized ion conductive material) was obtained.

Next, powder of the obtained sample B was put in a carbon-coated quartz tube and vacuum-sealed. The pressure of the quartz tube for vacuum-sealing was approximately 30 Pa. Next, the quartz tube was placed in a burning furnace, heated from room temperature to 300° C. over 2 hours, maintained at 300° C. for 5 hours, and thereafter slowly cooled up to room temperature. Thus, a sulfide solid electrolyte material having a composition of $Li_{3.75}P_{0.93}S_4$ was obtained.

Comparative Example 1

The sample A in Example 1 was regarded as a sample for comparison.

Comparative Example 2

The sample B in Example 1 was regarded as a sample for comparison.

Comparative Example 3

Lithium sulfide ($Li_2S$, manufactured by Nippon Chemical Industrial Co., Ltd.), diphosphorus pentasulfide ($P_2S_5$, manufactured by Sigma-Aldrich Co. LLC.) and germanium sulfide ($GeS_2$, manufactured by Kojundo Chemical Lab. Co., Ltd.) were used as a starting material. These powders were mixed in a glove box under an argon atmosphere at a ratio of 0.390529 g of $Li_2S$, 0.366564 g of $P_2S_5$ and 0.242907 g of $GeS_2$ to obtain a raw material composition. Next, 1 g of the raw material composition was put in a pot made of zirconia (45 ml) together with zirconia ball (10 mm ϕ, 10 pieces) to hermetically seal the pot completely (an argon atmosphere). This pot was mounted on a planetary ball milling machine (P7™ manufactured by Fritsch Japan Co., Ltd.) to perform mechanical milling for 40 hours at the number of weighing table revolutions of 370 rpm. Thus, an amorphized ion conductive material was obtained.

Next, powder of the obtained ion conductive material was put in a carbon-coated quartz tube and vacuum-sealed. The pressure of the quartz tube for vacuum-sealing was approximately 30 Pa. Next, the quartz tube was placed in a burning furnace, heated from room temperature to 550° C. over 6 hours, maintained at 550° C. for 8 hours, and thereafter slowly cooled up to room temperature. Thus, a sulfide solid electrolyte material having a composition of $Li_{3.35}Ge_{0.35}P_{0.65}S_4$ was obtained.

Comparative Example 4

Lithium sulfide ($Li_2S$, manufactured by Nippon Chemical Industrial Co., Ltd.), diphosphorus pentasulfide ($P_2S_5$, manufactured by Sigma-Aldrich Co. LLC.) and silicon sulfide ($SiS_2$, Alfa Aesar (registered trademark)) were used as a starting material. These powders were mixed in a glove box under an argon atmosphere at a ratio of 0.429936 g of $Li_2S$, 0.367033 g of $P_2S_5$ and 0.203031 g of $SiS_2$ to obtain a raw material composition. A sulfide solid electrolyte material was obtained in the same manner as Comparative Example 3 except for using the obtained raw material composition. The composition of the obtained sulfide solid electrolyte material was $Li_{3.4}Si_{0.4}P_{0.6}S_4$.

Comparative Example 5

Lithium sulfide ($Li_2S$, manufactured by Nippon Chemical Industrial Co., Ltd.), diphosphorus pentasulfide ($P_2S_5$, manufactured by Sigma-Aldrich Co. LLC.) and tin sulfide ($SnS_2$, manufactured by Kojundo Chemical Lab. Co., Ltd.) were used as a starting material. These powders were mixed in a glove box under an argon atmosphere at a ratio of 0.365069 g of $Li_2S$, 0.390958 g of $P_2S_5$ and 0.243972 g of $SnS_2$ to obtain a raw material composition. A sulfide solid electrolyte material was obtained in the same manner as Comparative Example 3 except for using the obtained raw material composition. The composition of the obtained sulfide solid electrolyte material was $Li_{3.275}Sn_{0.275}P_{0.725}S_4$.

[Evaluation]
(X-Ray Diffraction Measurement)

Figure 4A:
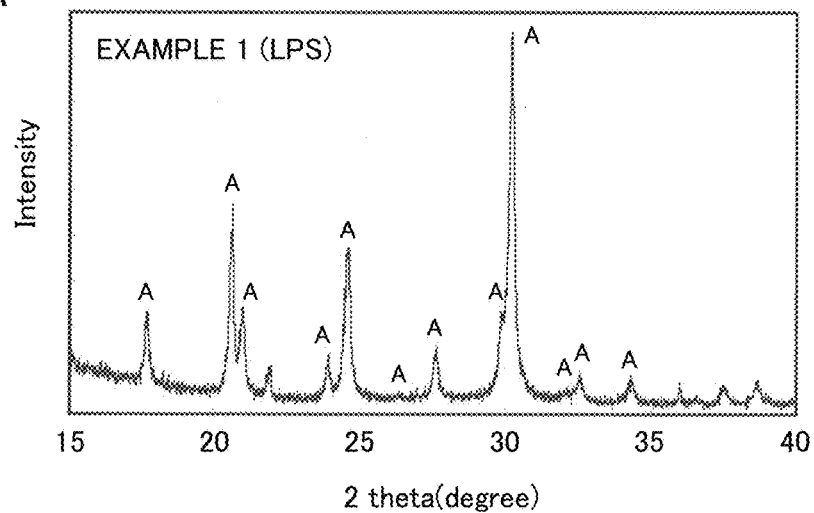
FIGS. 4A and 4B are each an X-ray diffraction spectrum of a sulfide solid electrolyte material obtained in Example 1 and Comparative Example 3.
Figure 4B:
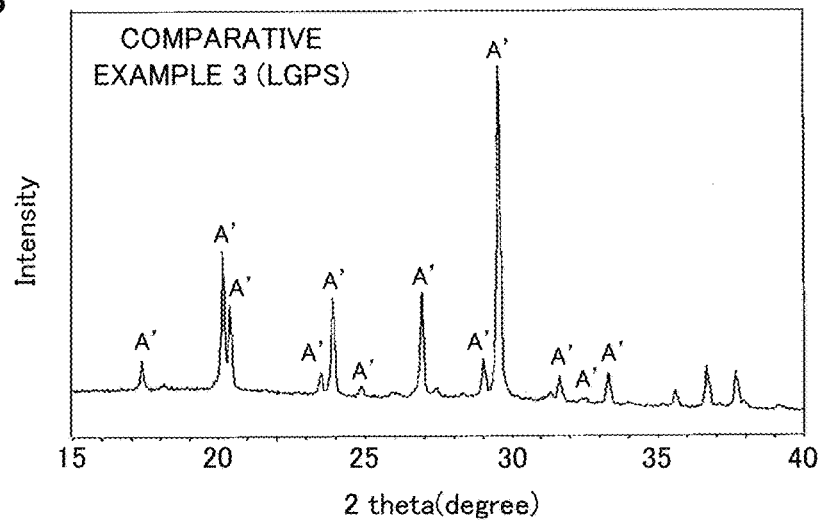
Figure 5:
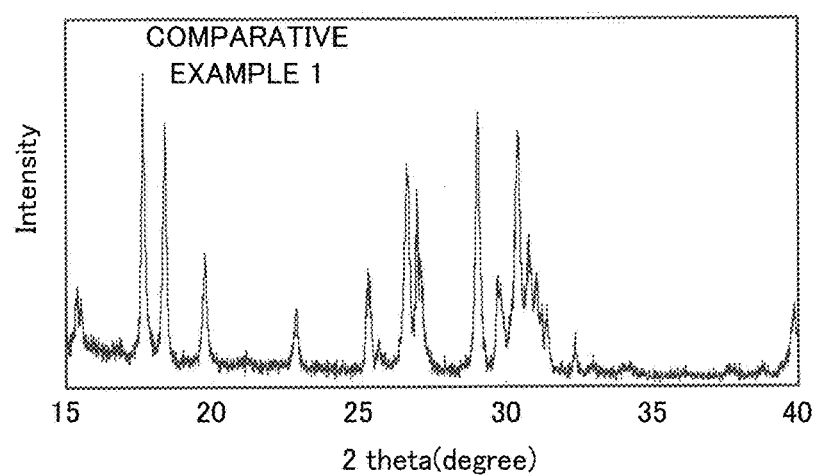
FIG. 5 is an X-ray diffraction spectrum of a sulfide solid electrolyte material obtained in Comparative Example 1.
Figure 6:
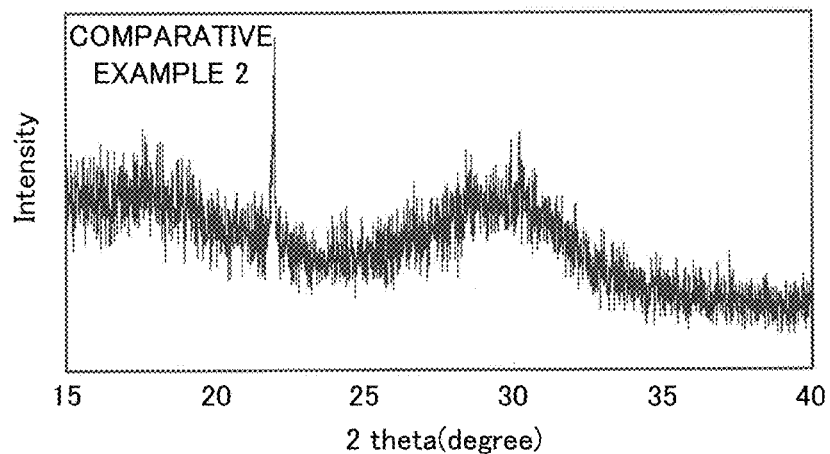
FIG. 6 is an X-ray diffraction spectrum of a sulfide solid electrolyte material obtained in Comparative Example 2.

X-ray diffraction (XRD) measurement was performed while using the sulfide solid electrolyte material obtained in each of Example 1 and Comparative Examples 1 to 5. XRD measurement was performed for a powder sample under an inert atmosphere on the conditions of using a CuKα ray. The results are shown in FIGS. 4 to 6. As shown in FIG. 4A, in Example 1, peaks appeared at a position of 2θ=17.69°, 20.60°, 21.01°, 23.94°, 24.60°, 26.32°, 27.62°, 29.96°, 30.21°, 32.15°, 32.54° and 34.33°. These peaks are the peaks of the crystal phase A with high ion conductivity. Incidentally, the peak of the crystal phase B with low ion conductivity was not confirmed. Also, FIG. 4B is a result of XRD measurement for the sulfide solid electrolyte material obtained in Comparative Example 3, and the peak of the crystal phase A' corresponding approximately to the crystal phase A was obtained. Although not shown in Figure, the same peak as the crystal phase A' was confirmed also in the sulfide solid electrolyte material obtained in Comparative Examples 4 and 5. On the other hand, as shown in FIGS. 5 and 6, the peak of the crystal phase A with high ion conductivity was not obtained in Comparative Examples 1 and 2. In particular, as Comparative Example 1, the crystal phase A with high ion conductivity was not formed even though the raw material composition was directly heated.

(X-Ray Structural Analysis)

The crystal structure of the sulfide solid electrolyte material obtained in Example 1 was identified by X-ray structural analysis. The crystal system and crystallographic group were determined by a direct method on the basis of a diffraction pattern obtained in XRD to thereafter identify the crystal structure by a real space method. As a result, it was confirmed that the sulfide solid electrolyte material had the crystal structure as shown in FIG. 1. That is to say, the crystal structure was such that the tetrahedron $T_1$ ($PS_4$ tetrahedron) and the octahedron O ($LiS_6$ octahedron) shared an edge, and the tetrahedron $T_2$ ($PS_4$ tetrahedron) and the octahedron O ($LiS_6$ octahedron) shared a corner.

(Li Ion Conductance Measurement)

Figure 7:
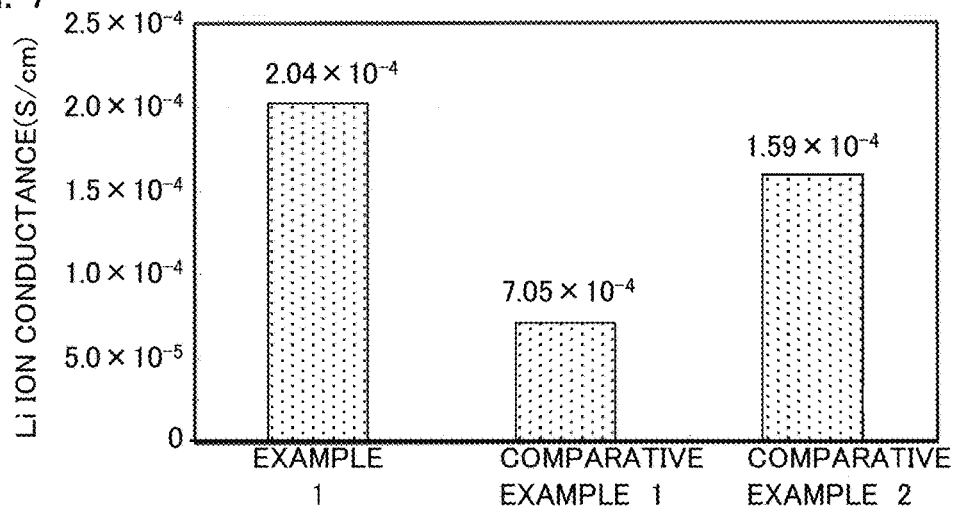
FIG. 7 is a result of measuring Li ion conductance of a sulfide solid electrolyte material obtained in each of Example 1 and Comparative Examples 1 and 2.
Figure 8:
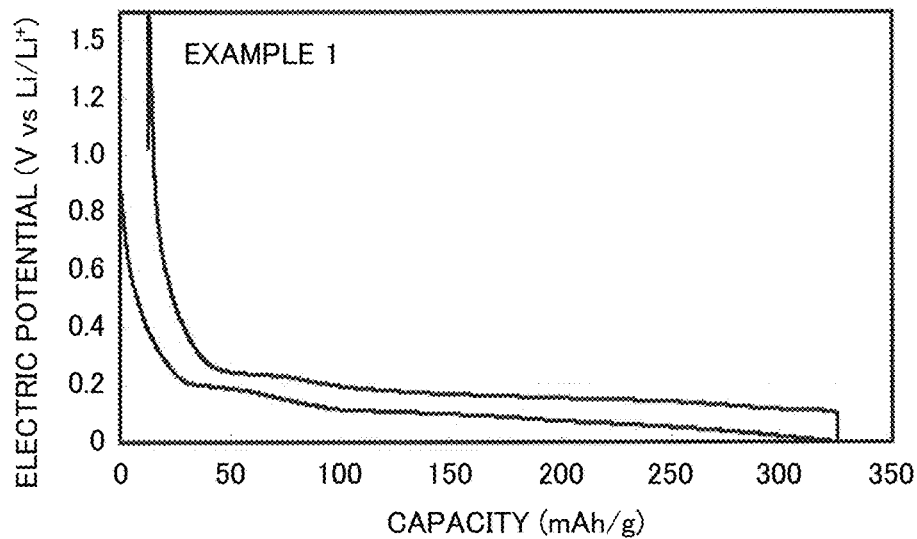
FIG. 8 is a graph showing the result of charge and discharge test of a battery using the sulfide solid electrolyte material obtained in Example 1.
Figure 9:
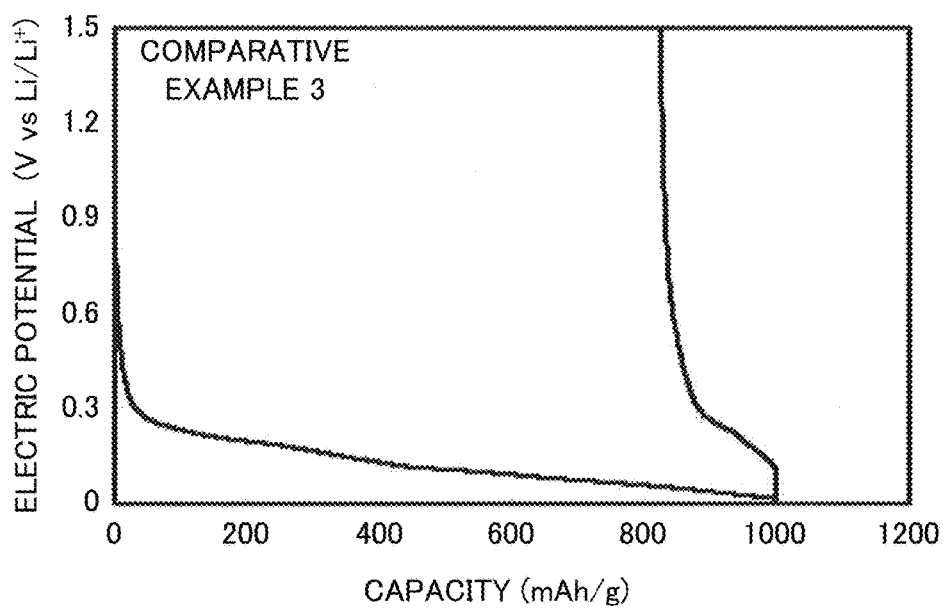
FIG. 9 is a graph showing the result of charge and discharge test of a battery using the sulfide solid electrolyte material obtained in Comparative Example 3.
Figure 10:
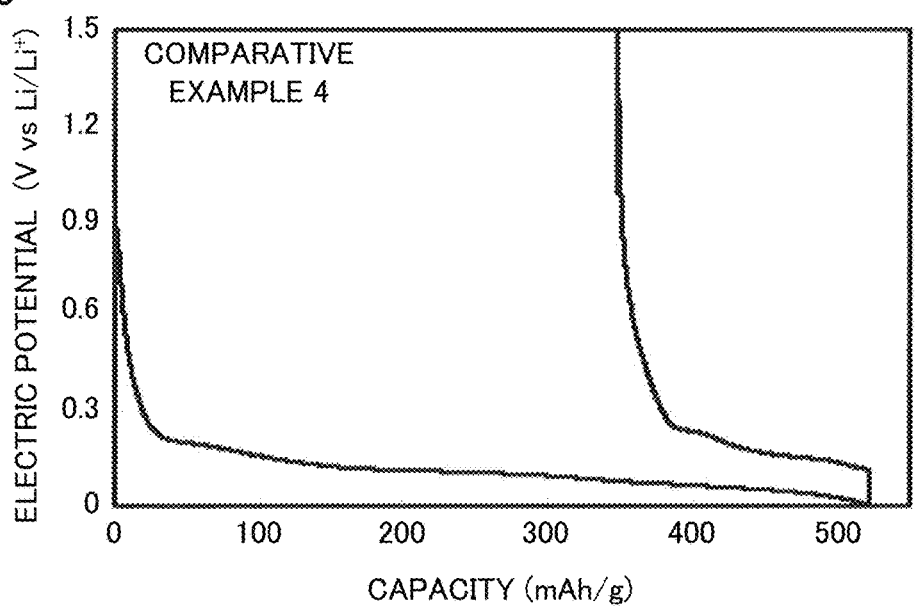
FIG. 10 is a graph showing the result of charge and discharge test of a battery using the sulfide solid electrolyte material obtained in Comparative Example 4.
Figure 11:
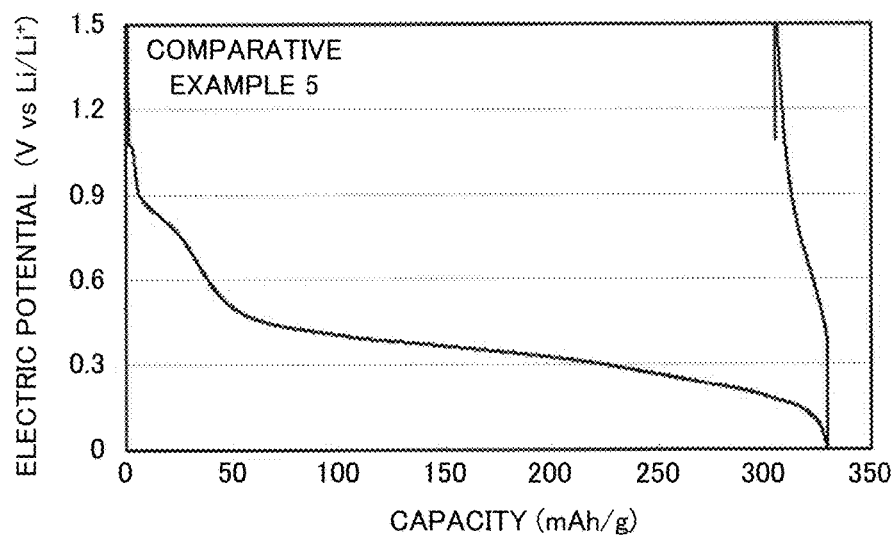
FIG. 11 is a graph showing the result of charge and discharge test of a battery using the sulfide solid electrolyte material obtained in Comparative Example 5.

Li ion conductance at a temperature of 25° C. was measured while using the sulfide solid electrolyte material obtained in each of Example 1 and Comparative Examples 1 and 2. First, the sulfide solid electrolyte material was weighed by 200 mg, put in a cylinder made of macole, and pressed at a pressure of 4 ton/cm². Both edges of the obtained pellets were held between a pin made of SUS, and confining pressure was applied to the pellets by bolting to obtain an evaluation cell. Li ion conductance was calculated by an alternating current impedance method in a state of maintaining the evaluation cell at a temperature of 25° C. Solartron 1260™ was used for the measurement, and impressed voltage was determined at 5 mV and measuring frequency band was determined at 0.01 to 1 MHz. The results are shown in FIG. 7. As shown in FIG. 7, Example 1 exhibited higher Li ion conductance than Comparative Examples 1 and 2. Thus, the crystal phase A may be confirmed to contribute to high Li ion conduction.

(Charge and Discharge Test)

An evaluation battery was produced by using the sulfide solid electrolyte material obtained in Example 1 and Comparative Examples 3 to 5 to evaluate charge and discharge efficiency. First, the $Li_3PS_4$ powder was weighed by 100 mg, put in a cylinder made of macole, and pressed at a pressure of 1 ton/cm² to obtain a solid electrolyte layer. Next, the sulfide solid electrolyte material and graphite powder were mixed at a weight ratio of 50:50, and the obtained powder was weighed by 12 mg, disposed on one surface of the solid electrolyte layer, and pressed at a pressure of 4 ton/cm² to obtain a working electrode. Lastly, an LiIn foil as a reference electrode was disposed on the other surface of the solid electrolyte layer, pressed at a pressure of 1 ton/cm², and bolted at 6 Ncm to obtain an evaluation battery.

The electric potential of the working electrode was charged up to −0.62 V with respect to the reference electrode, and thereafter discharged up to 1 V. The current density was determined at 0.15 mA/cm². The charge and discharge efficiency was calculated by the following formula.

Charge and discharge efficiency (%)=discharge capacity/charge capacity×100

The obtained results are shown in FIGS. 8 to 12.

Figure 12:
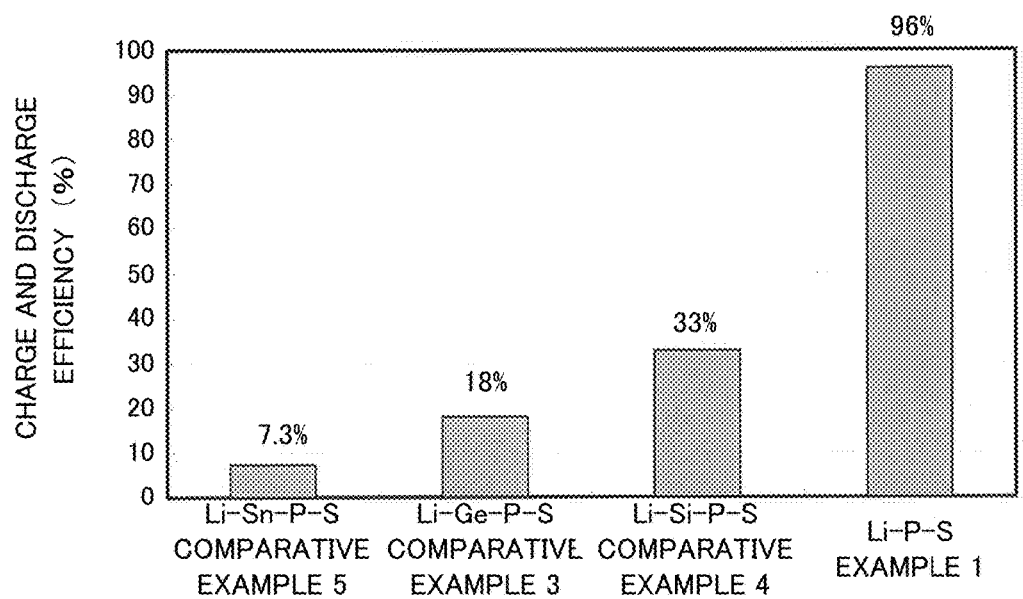
FIG. 12 is a graph showing the charge and discharge efficiency of batteries each using the sulfide solid electrolyte material obtained in Example 1 and Comparative Examples 3 to 5.

As shown in FIGS. 8 to 11, when each charge and discharge behavior was compared, a difference was caused in charge and discharge efficiency in accordance with kinds of the elements composing the sulfide solid electrolyte material even in the sulfide solid electrolyte material having the same crystal phase A. Also, as shown in FIG. 12, Comparative Examples 3 to 5 exhibited as low values of charge and discharge efficiency as 7.3%, 18% and 33% respectively. With regard to this fact, it is conceived that the consumption of electrical quantity due to the reduction reaction of a metallic element is a cause. On the contrary, Example 1 exhibited as remarkably high charge and discharge efficiency as 96%. With regard to this fact, it is conceived that no containing of a metallic element such as to cause reductive decomposition is a factor.

REFERENCE SIGNS LIST

1 . . . cathode active material layer
2 . . . anode active material layer
3 . . . electrolyte layer
4 . . . cathode current collector
5 . . . anode current collector
6 . . . battery case
10 . . . battery

What is claimed is:

1. A sulfide solid electrolyte material, comprising: a Li element; a P element; and a S element, wherein
   the sulfide solid electrolyte material has a crystal phase A containing peaks at positions of 2θ=17.69°±0.50°, 20.60°±0.50°, 24.60°±0.50°, 27.62°±0.50° and 30.21°±0.50° in X-ray diffraction measurement using a CuKαray,
   the sulfide solid electrolyte material optionally has a crystal phase B containing peaks at least at positions of 2θ=18.12° ±0.50°, 27.33° ±0.50° and 29.16° ±0.50 in X-ray diffraction measurement using a CuKαray,
   the sulfide solid electrolyte material does not substantially comprise a metallic element belonging to a third group to a sixteenth group of the periodic table of elements,
   the sulfide solid electrolyte material comprises a composition of $Li_{5x+2y+3}P_{1-x}S_4$ (0≤x≤0.2, 0<y≤0.3), and
   either the sulfide solid electrolyte material does not have the crystal phase B, or
   in the case where the sulfide solid electrolyte material has the crystal phase B, and diffraction intensity at the peak of 2θ=30.21° ±0.50° is regarded as $I_A$ and diffraction intensity at the peak of 2θ=27.33° ±0.50° is regarded as $I_B$, a value of $I_B/I_A$ is greater than 0 and less than 0.50.

2. A battery comprising a cathode active material layer containing a cathode active material, an anode active material layer containing an anode active material, and an electrolyte layer formed between the cathode active material layer and the anode active material layer,
   wherein at least one of the cathode active material layer, the anode active material layer and the electrolyte layer contains the sulfide solid electrolyte material according to claim 1.

3. A producing method for a sulfide solid electrolyte material, the sulfide solid electrolyte material being the sulfide solid electrolyte material according to claim 1, comprising steps of:
   an ion conductive material synthesizing step of synthesizing an amorphized ion conductive material by melt extraction while using a raw material composition containing a constituent of the sulfide solid electrolyte material; and
   a heating step of obtaining the sulfide solid electrolyte material by heating the amorphized ion conductive material.

4. The sulfide solid electrolyte material according to claim 1, wherein $I_B/I_A$ is 0 or more and 0.25 or less.

5. The sulfide solid electrolyte material according to claim 1, wherein $I_B/I_A$ is 0 or more and 0.15 or less.

6. The sulfide solid electrolyte material according to claim 1, wherein the molar ratio of the metallic element to the P element, is 0 or more and 0.08 or less.

7. The sulfide solid electrolyte material according to claim 1, wherein the molar ratio of the metallic element to the P element, is 0 or more and 0.05 or less.

8. The sulfide solid electrolyte material according to claim 1, wherein $I_B/I_A$ is 0 or more and 0.07 or less.

9. The sulfide solid electrolyte material according to claim 1, which does not have the crystal phase B.

10. A sulfide solid electrolyte material comprising a crystal structure containing an octahedron O composed of a Li element and a S element; a tetrahedron $T_1$ composed of a P element and a S element; and a tetrahedron $T_2$ composed of a P element and a S element,
    wherein the tetrahedron $T_1$ and the octahedron O share an edge, and the tetrahedron $T_2$ and the octahedron O share a corner,
    the sulfide solid electrolyte material does not substantially comprise a metallic element belonging to a third group to a sixteenth group of the periodic table of elements,
    the sulfide solid electrolyte material comprises a composition of $Li_{5x+2y+3}P_{1-x}S_4$ (0≤x≤0.2, 0 <y≤0.3),
    the sulfide solid electrolyte material has a crystal phase A containing a peak at a position of 30.21° ±0.50° in X-ray diffraction measurement using a CuKαray,
    the sulfide solid electrolyte material optionally has a crystal phase B containing peaks at least at positions of 2θ=18.12° ±0.50°, 27.33° ±0.50° and 29.16° ±0.50 in X-ray diffraction measurement using a CuKαray,
    either the sulfide solid electrolyte material does not have the crystal phase B, or
    in the case where the sulfide solid electrolyte material has the crystal phase B, and diffraction intensity at the peak of 2θ=30.21° ±0.50° is regarded as $I_A$ and diffraction intensity at the peak of 2θ=27.33° ±0.50° is regarded as $I_B$, a value of $I_B/I_A$ is greater than 0 and less than 0.50.

11. A battery comprising a cathode active material layer containing a cathode active material, an anode active material layer containing an anode active material, and an electrolyte layer formed between the cathode active material layer and the anode active material layer,
    wherein at least one of the cathode active material layer, the anode active material layer and the electrolyte layer contains the sulfide solid electrolyte material according to claim 10.

12. A producing method for a sulfide solid electrolyte material, the sulfide solid electrolyte material being the sulfide solid electrolyte material according to claim 10, comprising steps of:
- an ion conductive material synthesizing step of synthesizing an amorphized ion conductive material by melt extraction while using a raw material composition containing a constituent of the sulfide solid electrolyte material; and
- a heating step of obtaining the sulfide solid electrolyte material by heating the amorphized ion conductive material.

13. The sulfide solid electrolyte material according to claim 10, wherein $I_B/I_A$ is 0 or more and 0.25 or less.

14. The sulfide solid electrolyte material according to claim 10, wherein $I_B/I_A$ is 0 or more and 0.15 or less.

15. The sulfide solid electrolyte material according to claim 10, wherein the molar ratio of the metallic element to the P element, is 0 or more and 0.08 or less.

16. The sulfide solid electrolyte material according to claim 10, wherein the molar ratio of the metallic element to the P element, is 0 or more and 0.05 or less.

17. The sulfide solid electrolyte material according to claim 10, wherein $I_B/I_A$ is 0 or more and 0.07 or less.

18. The sulfide solid electrolyte material according to claim 10, which does not have the crystal phase B.

* * * * *